US012701389B2

(12) United States Patent
Chen

(10) Patent No.: US 12,701,389 B2
(45) Date of Patent: Aug. 4, 2026

(54) VEHICLE CONTROL METHOD AND DEVICE, VEHICLE, ADAPTER, TERMINAL, AND MEDIUM

(71) Applicant: Xiaomi EV Technology Co., Ltd., Beijing (CN)

(72) Inventor: Hao Chen, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 81 days.

(21) Appl. No.: 18/764,572

(22) Filed: Jul. 5, 2024

(65) Prior Publication Data

US 2025/0016535 A1 Jan. 9, 2025

(30) Foreign Application Priority Data

Jul. 5, 2023 (CN) .......................... 202310822750.6

(51) Int. Cl.
*H04W 4/48* (2018.01)
*G06F 13/42* (2006.01)
*H04L 67/12* (2022.01)

(52) U.S. Cl.
CPC .......... *H04W 4/48* (2018.02); *G06F 13/4282* (2013.01); *H04L 67/12* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 7,778,750 | B2 * | 8/2010 | Knight | H04L 12/4604 |
| | | | | 709/200 |
| 9,645,962 | B2 * | 5/2017 | Voto | G06F 13/385 |
| 11,997,164 | B2 * | 5/2024 | Kanamori | H04L 67/12 |
| 12,007,926 | B2 * | 6/2024 | Lee | G06F 13/4022 |
| 2003/0163587 | A1 | 8/2003 | Knight et al. | |
| 2007/0142024 | A1 | 6/2007 | Clayton et al. | |
| 2016/0197782 | A1 * | 7/2016 | Hort | H04L 41/0889 |
| | | | | 709/222 |
| 2016/0371213 | A1 | 12/2016 | Voto et al. | |

(Continued)

FOREIGN PATENT DOCUMENTS

| | | |
|---|---|---|
| CN | 107168666 A | 9/2017 |
| CN | 208174327 U | 11/2018 |

(Continued)

*Primary Examiner* — Peter D Nolan
*Assistant Examiner* — Jacob Kent Besteman-Street
(74) *Attorney, Agent, or Firm* — Volpe Koenig

(57) ABSTRACT

A vehicle control method, an adapter interface, apparatus and computer readable medium for improving in vehicle connectivity. The in-vehicle connectivity is improved by: in response to determining that a mobile terminal accesses the cockpit domain controller through the adapter interface, universal serial communication connection between the mobile terminal and a terminal interface of an adapter and between a vehicle interface of the adapter and the adapter interface is established; a vehicle control instruction forwarded by the adapter is received, and the vehicle control instruction is generated by the mobile terminal in response to a user operation and transmitted to the adapter; and vehicle control corresponding to the vehicle control instruction is executed using the cockpit domain controller.

19 Claims, 7 Drawing Sheets

Establish communication connection between an adapter and a cockpit domain controller through a universal serial bus in response to determining that a mobile terminal accesses the cockpit domain controller using an adapter interface, where universal serial communication connection is established between the mobile terminal and a terminal interface of the adapter and between a vehicle interface of the adapter and the adapter interface — S11

Receive a vehicle control instruction of a universal serial bus protocol type transmitted by the adapter, where the vehicle control instruction is generated by the mobile terminal in response to a user operation and transmitted to the adapter — S12

Execute vehicle control corresponding to the vehicle control instruction using the cockpit domain controller — S13

(56) References Cited

U.S. PATENT DOCUMENTS

| | | | | |
|---|---|---|---|---|
| 2018/0072190 A1* | 3/2018 | Kowalski | ............. | B60N 2/0244 |
| 2020/0287745 A1 | 9/2020 | Lavy | | |
| 2021/0218813 A1 | 7/2021 | Kanamori | | |
| 2022/0219666 A1* | 7/2022 | Nagata | ................... | B60R 25/24 |
| 2022/0237136 A1 | 7/2022 | Lee | | |

FOREIGN PATENT DOCUMENTS

| | | | |
|---|---|---|---|
| DE | 102013013167 B3 | 10/2014 |
| JP | 2019027816 A | 2/2019 |
| KR | 100641047 B1 | 11/2006 |

* cited by examiner

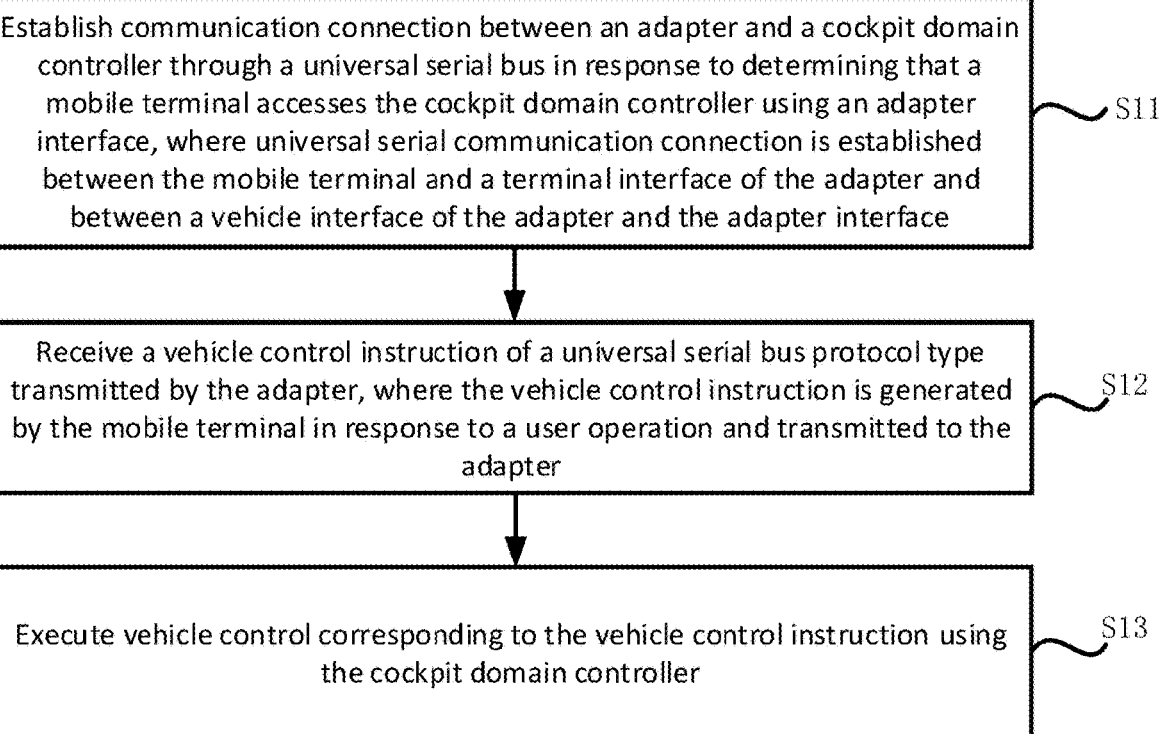

Establish communication connection between an adapter and a cockpit domain controller through a universal serial bus in response to determining that a mobile terminal accesses the cockpit domain controller using an adapter interface, where universal serial communication connection is established between the mobile terminal and a terminal interface of the adapter and between a vehicle interface of the adapter and the adapter interface ～S11

Receive a vehicle control instruction of a universal serial bus protocol type transmitted by the adapter, where the vehicle control instruction is generated by the mobile terminal in response to a user operation and transmitted to the adapter ～S12

Execute vehicle control corresponding to the vehicle control instruction using the cockpit domain controller ～S13

Fig. 1

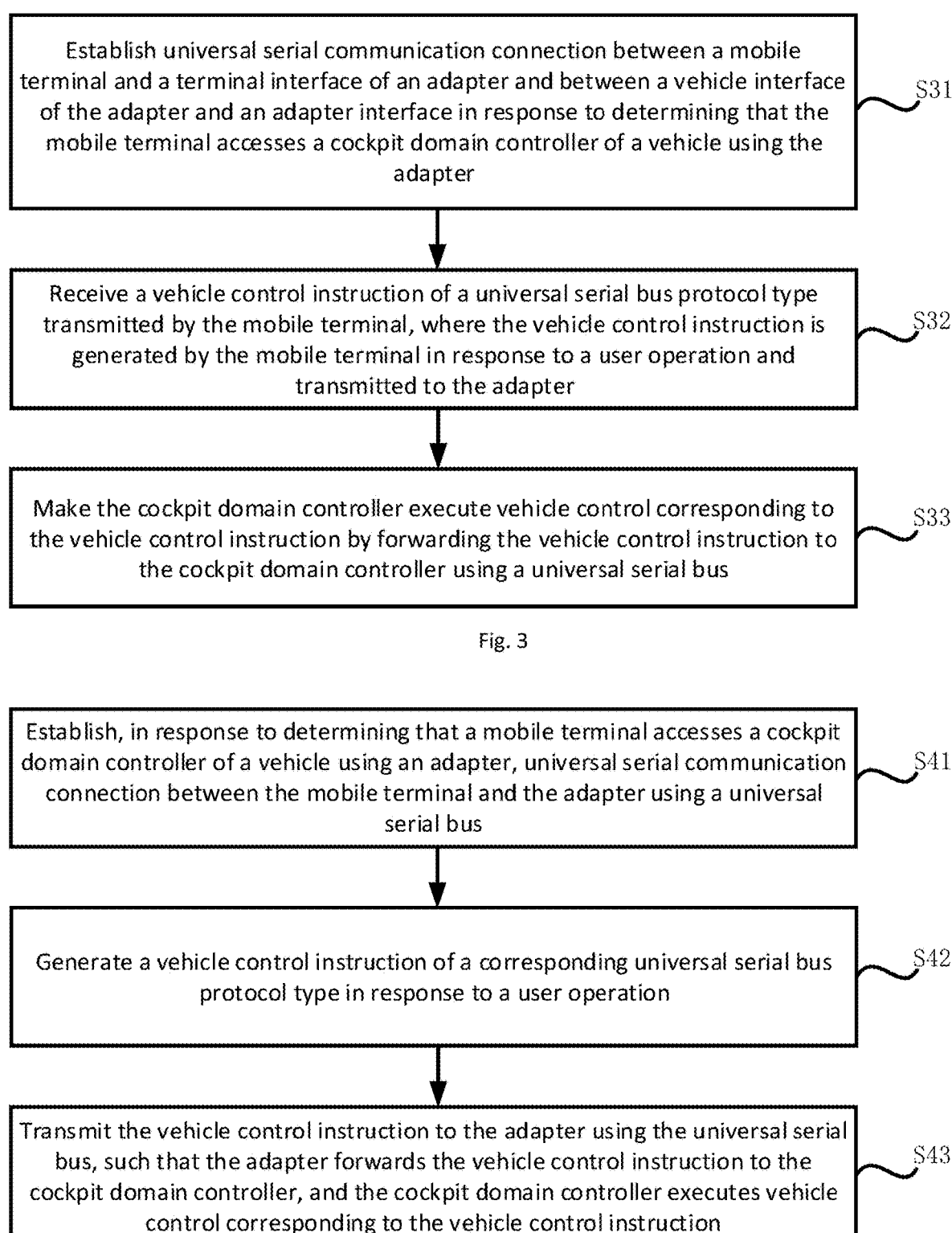

Establish universal serial communication connection between a mobile terminal and a terminal interface of an adapter and between a vehicle interface of the adapter and an adapter interface in response to determining that the mobile terminal accesses a cockpit domain controller of a vehicle using the adapter     S31

Receive a vehicle control instruction of a universal serial bus protocol type transmitted by the mobile terminal, where the vehicle control instruction is generated by the mobile terminal in response to a user operation and transmitted to the adapter     S32

Make the cockpit domain controller execute vehicle control corresponding to the vehicle control instruction by forwarding the vehicle control instruction to the cockpit domain controller using a universal serial bus     S33

Fig. 3

Establish, in response to determining that a mobile terminal accesses a cockpit domain controller of a vehicle using an adapter, universal serial communication connection between the mobile terminal and the adapter using a universal serial bus     S41

Generate a vehicle control instruction of a corresponding universal serial bus protocol type in response to a user operation     S42

Transmit the vehicle control instruction to the adapter using the universal serial bus, such that the adapter forwards the vehicle control instruction to the cockpit domain controller, and the cockpit domain controller executes vehicle control corresponding to the vehicle control instruction     S43

Fig. 4

VEHICLE CONTROL METHOD AND DEVICE, VEHICLE, ADAPTER, TERMINAL, AND MEDIUM

CROSS-REFERENCE

The present application claims the benefit of priority to Chinese Application No. 202310822750.6, filed on Jul. 5, 2023, the contents of which are incorporated herein by reference in their entirety for all purposes.

BACKGROUND

Generally, a vehicle is able to receive information transmitted by a mobile terminal that is connected to the vehicle via Bluetooth.

SUMMARY

The disclosure relates to the technical field of vehicle engineering, in particular to a vehicle control method and device, a vehicle, an adapter, a terminal, and a medium.

According to a first aspect of examples of the disclosure, a vehicle control method is provided. The vehicle control method is performed by a vehicle. At least one adapter interface is configured in the vehicle, the adapter interface is connected to a hub in a cockpit domain controller using a universal serial bus, and the vehicle control method includes:

establishing a communication connection between an adapter and the cockpit domain controller via the universal serial bus in response to determining that a mobile terminal accesses the cockpit domain controller using the adapter interface, where a universal serial communication connection is established between the mobile terminal and a terminal interface of the adapter and between a vehicle interface of the adapter and the adapter interface;

receiving a vehicle control instruction of a universal serial bus protocol type transmitted by the adapter, where the vehicle control instruction is generated by the mobile terminal in response to a user operation and transmitted to the adapter; and executing vehicle control corresponding to the vehicle control instruction using the cockpit domain controller.

According to a second aspect of the examples of the disclosure, a vehicle control method is provided. An adapter performs the vehicle control method. The adapter is configured with a vehicle interface for being connected to an adapter interface, and a terminal interface for being connected to a mobile terminal. The adapter interface is connected to a hub in a cockpit domain controller using a universal serial bus, and the vehicle control method includes:

establishing a universal serial communication connection between the mobile terminal and the terminal interface of the adapter and between the vehicle interface of the adapter and the adapter interface in response to determining that the mobile terminal accesses a cockpit domain controller of the vehicle using the adapter;

receiving a vehicle control instruction of a universal serial bus protocol type transmitted by the mobile terminal, where the vehicle control instruction is generated by the mobile terminal in response to a user operation and transmitted to the adapter; and forwarding the vehicle control instruction to the cockpit domain controller using the universal serial bus to enable the cockpit domain controller to execute vehicle control corresponding to the vehicle control instruction.

According to a third aspect of the examples of the disclosure, a vehicle control method is provided. The vehicle control method is performed by a mobile terminal and includes:

establishing, in response to determining that the mobile terminal accesses a cockpit domain controller of a vehicle using an adapter, a universal serial communication connection between the mobile terminal and the adapter using a universal serial bus, where the adapter is configured with a vehicle interface for being connected to an adapter interface, and a terminal interface for being connected to a mobile terminal, the adapter interface is connected to a hub in a cockpit domain controller using a universal serial bus;

generating a vehicle control instruction of a universal serial bus protocol type in response to a user operation; and transmitting the vehicle control instruction to the adapter using the universal serial bus, such that the adapter forwards the vehicle control instruction to the cockpit domain controller, and the cockpit domain controller executes vehicle control corresponding to the vehicle control instruction.

According to a fourth aspect of the examples of the disclosure, a vehicle is provided. The vehicle includes:

a first processor; and a first memory configured to store an instruction executable by the first processor, where the first processor is configured to execute the executable instruction stored in the first memory, so as to implement the vehicle control method according to the first aspect.

According to a fifth aspect of the examples of the disclosure, an adapter is provided. The adapter includes:

a second processor; and a second memory configured to store an instruction executable by the second processor, where the second processor is configured to execute the executable instruction stored in the second memory, so as to implement the vehicle control method according to the second aspect.

According to a sixth aspect of the examples of the disclosure, a mobile terminal is provided. The mobile terminal includes:

a third processor; and a third memory configured to store an instruction executable by the third processor, where the third processor is configured to execute the executable instruction stored in the third memory, so as to implement the vehicle control method according to the third aspect.

According to a seventh aspect of the examples of the disclosure, a computer-readable storage medium is provided. The computer-readable storage medium stores a computer program instruction. The program instruction implements steps of the vehicle control method according to the first aspect when executed by a fourth processor.

According to an eighth aspect of the examples of the disclosure, a computer-readable storage medium is provided. The computer-readable storage medium stores a computer program instruction. The program instruction implements steps of the vehicle control method according to the second aspect when executed by a fifth processor.

According to a ninth aspect of the examples of the disclosure, a computer-readable storage medium is provided. The computer-readable storage medium stores a computer program instruction. The program instruction implements steps of the vehicle control method according to the third aspect when executed by a sixth processor.

It should be understood that both the foregoing general description and the following detailed description are illustrative and interpretative and are not restrictive of the disclosure.

BRIEF DESCRIPTION OF DRAWINGS

The accompanying drawings are incorporated in the description as a constituent part of the description, illustrate examples conforming to the disclosure, and serve to explain the principles of the disclosure together with the specification.

FIG. 1 is a flowchart of a vehicle control method on a vehicle side according to an example;

FIG. 3 is a flowchart of a vehicle control method on an adapter side according to an example;

FIG. 4 is a flowchart of a vehicle control method on a mobile terminal side according to an example;

DETAILED DESCRIPTION

A description will be made in detail to examples here, instances of which are illustrated in the accompanying drawings. When the following description relates to the accompanying drawings, the same numbers in different accompanying drawings refer to the same or similar elements unless otherwise indicated. The embodiments described in the following examples do not represent all embodiments consistent with the disclosure. Rather, they are merely instances of apparatuses and methods consistent with some aspects of the disclosure as detailed in the appended claims.

It should be noted that in the present disclosure, all the actions of obtaining a signal, information, or data are performed under the premise of complying with corresponding data protection laws and regulations of the country where they are located, and obtaining the authorization given by an owner of a corresponding device.

Generally, a vehicle is merely able to receive information transmitted by a mobile terminal accessing an interface in the main driver's seat, and interfaces in the other seats are merely able to charge a mobile terminal or receive information transmitted by a mobile terminal that is connected to the vehicle via Bluetooth, resulting in low flexibility in vehicle control.

In order to solve the problems existing in the related art, the disclosure provides a vehicle control method and device, a vehicle, an adapter, a terminal, and a medium.

Figure 2:
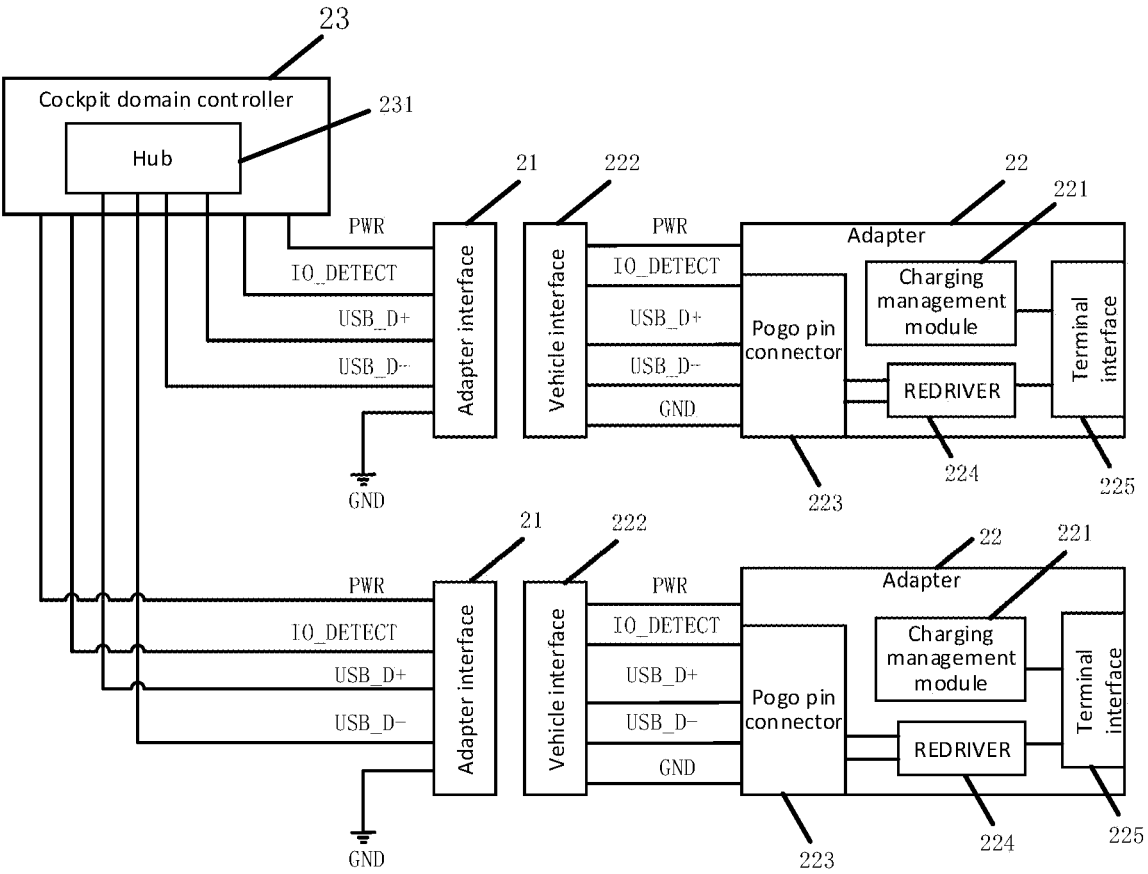
FIG. 2 is a schematic diagram of vehicle control implementation according to an example.

FIG. 1 is a flowchart of a vehicle control method on a vehicle side according to an example. The vehicle control method is performed by a vehicle. At least one adapter interface is configured in the vehicle. The adapter interface is connected to a hub in a cockpit domain controller using a universal serial bus (USB). It can be explained that the hub can achieve connection of a plurality of adapter interfaces to the cockpit domain controller, such that not only plug and play is achieved and practicality and convenience are improved, but also a plurality of adapter interfaces can be connected compared with the related art. With reference to FIG. 2, the adapter interface 21 may include a USB_D+pin, a USB_D–pin, a power PWR pin, a ground GND pin, and a detection IO_DETECT pin. The IO_DETECT pin is configured to detect whether an adapter 22 plugs in, and the PWR pin is configured to supply power to the adapter 22. As shown in FIG. 1, the vehicle control method includes the following steps.

S11, establish a communication connection between an adapter and the cockpit domain controller via the universal serial bus in response to determining that a mobile terminal accesses the cockpit domain controller using the adapter interface, where a universal serial communication connection is established between the mobile terminal and a terminal interface of the adapter and between a vehicle interface of the adapter and the adapter interface.

In the example of the disclosure, in response to determining that the adapter is inserted into any adapter interface via the vehicle interface, the detection pin detects that no mobile terminal plugs in, and no communication connection between the mobile terminal and the cockpit domain controller is established. When the mobile terminal is connected to the terminal interface of the adapter, the vehicle interface of the adapter is connected to any adapter interface, a detection pin of the corresponding adapter interface outputs a signal, and the cockpit domain controller can establish a communication connection between the mobile terminal and the cockpit domain controller according to the signal.

The terminal interface of the adapter may be USB 2.0. In this way, using the universal serial bus, not only can the mobile terminal communicate with the vehicle using the adapter, but also the vehicle can be controlled using the mobile terminal, and no protocol conversion is required for communication using the universal serial bus, such that universality and convenience are improved.

S12, receive a vehicle control instruction of a universal serial bus protocol type transmitted by the adapter, where the vehicle control instruction is generated by the mobile terminal in response to a user operation and transmitted to the adapter.

It can be understood that the vehicle control instruction may be a vehicle control instruction of a universal serial bus protocol type, that is, the mobile terminal generates the vehicle control instruction of a universal serial bus protocol type in response to the user operation and transmits the vehicle control instruction to the adapter, and the adapter directly forwards the vehicle control instruction of a universal serial bus protocol type to the cockpit domain controller of the vehicle. In this way, conversion between protocols can be reduced, and commonality can be improved.

S13, execute vehicle control corresponding to the vehicle control instruction using the cockpit domain controller.

The technical solution provided in the examples of the disclosure has the beneficial effects as follows:

An adapter interface configured in the vehicle is connected to a hub in a cockpit domain controller using a universal serial bus. In response to determining that a mobile terminal accesses the cockpit domain controller via the adapter interface, universal serial communication connection between the mobile terminal and a terminal interface of an adapter and between a vehicle interface of the adapter and the adapter interface is established; a vehicle control instruction transmitted by the adapter is received, and the vehicle control instruction is generated by the mobile terminal in response to a user operation and forwarded to the cockpit domain controller using the adapter; and vehicle control corresponding to the vehicle control instruction is executed using the cockpit domain controller. A vehicle control function is implemented using the universal serial bus, and communication between the vehicle and the adapter and between the adapter and the mobile terminal is implemented using the universal serial bus, such that the problem of communication between the mobile terminal and the vehicle is solved, the mobile terminal is playable when plugged, usage scenarios in the vehicle are increased, and flexibility of vehicle control is improved. Any adapter interface is connected to the adapter, and then the adapter is connected to the mobile terminal, such that fast iteration of the mobile terminal can be adapted.

It can be explained that the vehicle control method provided in the disclosure can be applied to any scene where the vehicle is running or parked.

It can be understood that the cockpit domain controller is connected to a controller area network (CAN) bus of the entire vehicle, and then, according to a vehicle control instruction of a CAN bus protocol type, the instruction can be transmitted to a corresponding vehicle actuator using the CAN bus, such that corresponding vehicle control is implemented.

In the example of the disclosure, each adapter interface may be set in a control area of the vehicle. For example, an area in the vehicle is divided into a plurality of control areas according to seat distribution in the vehicle. Each control area is correspondingly provided with an adapter interface, such that when the mobile terminal is connected to the adapter interface using the adapter, a vehicle load in the control area corresponding to the accessed adapter interface may be controlled by the mobile terminal.

For example, the vehicle area in the vehicle is divided into a passenger seat area, a left rear row area, a right rear row area, and a middle rear row area. One adapter interface is correspondingly arranged in each of the passenger seat area, the left rear row area, the right rear row area, and the middle rear row area. For example, when the mobile terminal accesses the adapter interface corresponding to the left rear row area, in response to determining that the mobile terminal transmits a vehicle control instruction for controlling a window, the cockpit domain controller may transmit the vehicle control instruction for controlling the window to, for example, a vehicle body control module using the CAN bus, and further may control opening or closing of a left rear window using the mobile terminal. Certainly, the mobile terminal may also transmit, for example, a vehicle control instruction for controlling a sun shade, such that the opening degree of the sun shade can be adjusted using the mobile terminal. The mobile terminal may also transmit a vehicle control instruction for controlling an air conditioner. Such that an open degree, an air volume, and a temperature of an air outlet of an air conditioner in the left rear area can be controlled using the mobile terminal.

For another example, when the mobile terminal accesses the adapter interface corresponding to the passenger seat area, the mobile terminal may transmit a vehicle control instruction for controlling a passenger seat, such that the mobile terminal may control the passenger seat. For example, a leg rest and a lumbar rest of the passenger seat may be retracted or extended; a massage function, a seat ventilation function, and a seat heating function of the passenger seat may be turned on or off; and a backrest inclination of the passenger seat may be adjusted.

According to the above solution, a vehicle control function is implemented using the universal serial bus, and communication between the vehicle and the adapter and between the adapter and the mobile terminal is implemented using the universal serial bus, such that the problem of communication between the mobile terminal and the vehicle is solved, the mobile terminal is playable when plugged, usage scenarios in the vehicle are increased, and flexibility of vehicle control is improved. Any adapter interface is connected to the adapter, and then the adapter is connected to the mobile terminal, such that fast iteration of the mobile terminal can be adapted.

In some examples, a plurality of adapter interfaces are provided, and the vehicle control method includes:

determine a master adapter interface and a slave adapter interface from the plurality of adapter interfaces.

In an embodiment, the master adapter interface or the slave adapter interface may each be an adapter interface that is connected to the mobile terminal or not.

In another embodiment, the master adapter interface and the slave adapter interface may be determined from adapter interfaces that establish a communication connection. Adapter interfaces, which do not establish the communication connection, do not participate in the determination of the master adapter interface and the slave adapter interface.

In the example of the disclosure, a configuration option for the adapter interfaces may be displayed on the multimedia display screen of the vehicle. Further, a master adapter interface and a slave adapter interface may be determined from the plurality of adapter interfaces according to a user operation on the configuration option on the multimedia display screen.

In the example of the disclosure, a vehicle control instruction transmitted via the master adapter interface may control a vehicle load in a control area corresponding to the master adapter interface, and may also control a vehicle load in a control area corresponding to any slave adapter interface, such that vehicle loads in other areas may be controlled via the master adapter interface. Convenience may be improved under the condition that, for example, there are no passengers in the area corresponding to the slave adapter interface, or it is inconvenient for passengers to control the vehicle load. The vehicle control instruction transmitted via the slave adapter interface can control the vehicle load in the control area corresponding to the slave adapter interface, cannot control the vehicle load in the control area corresponding to the master adapter interface, cannot control the vehicle load in the control areas corresponding to other slave adapter interfaces, and cannot control the vehicle loads in the control areas corresponding to adapter interfaces not connected to the mobile terminal.

For example, in response to determining that the adapter interface corresponding to the passenger seat area is the master adapter interface, and the adapter interfaces corresponding to other areas are slave adapter interfaces, a vehicle control instruction transmitted via the adapter interface corresponding to the passenger seat area can control a window in the passenger seat area and can also control a window in the right rear row area, while a vehicle control instruction transmitted via the adapter interface corresponding to the right rear row area can control the window in the right rear row area and cannot control the window in the passenger seat area.

Streaming media data transmitted by a first target mobile terminal connected to the master adapter interface is received using the universal serial bus. The first target mobile terminal is connected to the master adapter interface using the adapter, and the streaming media data is generated by the first target mobile terminal according to the played audio and video in response to a projection operation.

It can be understood that the mobile terminal may generate the corresponding streaming media data according to the played audio and video in response to the projection operation by the user, and then transmit the streaming media data to the adapter connected using the universal serial bus. The adapter transmits the received streaming media data to the cockpit domain controller of the vehicle connected to the adapter using the universal serial bus.

Projection display is performed on a multimedia display screen of the vehicle according to the streaming media data.

In the example of the disclosure, the cockpit domain controller may transmit the received streaming media data to the multimedia display screen via the universal serial bus and further project the streaming media data on the multimedia display screen of the vehicle.

For a second target mobile terminal accessing the cockpit domain controller using the slave adapter interface, a transmission prohibition instruction is transmitted to the second target mobile terminal using the universal serial bus. The transmission prohibition instruction is configured to prohibit the second target mobile terminal from transmitting the streaming media data to the cockpit domain controller.

In the example of the disclosure, the second target mobile terminal may prohibit the use of a projection operation function when receiving the transmission prohibition instruction, for example, hide a projection button or gray the projection operation button. In this way, the display content of the first target mobile terminal may be projected on the multimedia display screen of the vehicle, and the projection function of the second target mobile terminal may be prohibited to prevent a collision.

According to the technical solution, the universal serial bus can not only transmit a vehicle control instruction, but also transmit streaming media data rapidly and stably, such that projection can be implemented via the master adapter interface. The problem that projection can only be performed from the universal serial bus interface at a driver position in the related art, with low convenience and flexibility, is solved.

In some examples, the step of determining a master adapter interface and a slave adapter interface from the plurality of adapter interfaces includes:

determine, after the vehicle is started, a corresponding adapter interface first in the communication connection as the master adapter interface, and determine the adapter interfaces other than the master adapter interface as the slave adapter interfaces.

In the example of the disclosure, the corresponding adapter interface first in the communication connection is usually the one that accesses the cockpit domain controller of the vehicle first via the adapter. After the vehicle is turned off, both the master adapter interface and the slave adapter interface are reset. After the mobile terminal is inserted next time, a master adapter interface and a slave adapter interface are re-determined from the plurality of adapter interfaces.

In an embodiment, in response to a communication disconnection of the current master adapter interface from the corresponding first target mobile terminal, an adapter interface connected to the mobile terminal after the adapter interface that is first in the communication connection may be determined as the master adapter interface.

According to the technical solution, the master adapter interface and the slave adapter interface can be determined according to an insertion sequence every time the vehicle is started, without setting or changing on the multimedia display screen. Flexibility of determining the master adapter interface and the slave adapter interface is improved.

In some examples, the step of determining a master adapter interface and a slave adapter interface from the plurality of adapter interfaces includes:

display an interface selection option on the multimedia display screen in response to a communication disconnection of a current master adapter interface from a corresponding first target mobile terminal, where the interface selection option is configured to display the adapter interface currently in the communication connection; and determine an adapter interface corresponding to a selected interface selection option as the master adapter interface, and determine adapter interfaces other than the master adapter interface as the slave adapter interfaces.

In the example of the disclosure, the interface selection option may be displayed on the multimedia display screen, for example, the interface selection option may display each adapter interface in the form of a list, so as to determine an adapter interface corresponding to a selected interface selection option as the master adapter interface, and determine adapter interfaces other than the master adapter interface as the slave adapter interfaces.

According to the technical solution, under the condition that the determined master adapter interface is not suitable, the connection can be stopped, and a master adapter interface is selected again via the interface selection option, such that the flexibility of switching the master adapter interface is improved.

In some examples, the step of executing vehicle control corresponding to the vehicle control instruction using the cockpit domain controller includes:

execute, in response to determining that a vehicle control instruction from the first target mobile terminal corresponding to the master adapter interface and a vehicle control instruction from the second target mobile terminal corresponding to the slave adapter interface indicate same vehicle control, vehicle control corresponding to the vehicle control instruction transmitted by the first target mobile terminal using the cockpit domain controller, and invalidate the vehicle control instruction transmitted by the second target mobile terminal.

It can be noted that the vehicle control instruction from the first target mobile terminal and the vehicle control instruction from the second target mobile terminal that indicate the same vehicle control, for example, may be a vehicle control instruction for the same vehicle load, but a vehicle control operation of the vehicle control instructions is different. For example, the vehicle control instruction of the first target mobile terminal is to control a right rear window to close, and the vehicle control instruction of the second target mobile terminal is to control the right rear window to open. Right rear window closing is executed by the cockpit domain controller, and the vehicle control instruction corresponding to the right rear window closing is invalidated.

According to the technical solution, by determining the master adapter interface and the slave adapter interface, the master adapter interface can control the vehicle load in any area, and the slave adapter interface can control the vehicle load in the corresponding area, such that the convenience of the mobile terminal in controlling the vehicle load is improved.

In some examples, the vehicle control instruction includes at least one of an air conditioning adjustment instruction, a window control instruction, a seat adjustment instruction, an interior ambient lamp control instruction, and a sunshade control instruction.

It can be understood that the air conditioner adjustment instruction can be configured to adjust an air output volume, a temperature, etc., of an air conditioner. The window control instruction can be configured to lock a window, open a window, close a window, etc. The seat adjustment instruction can be configured to turn on or off seat ventilation, and turn on or off seat heating, etc. The interior ambient lamp control instruction can be configured to turn on or off an ambient lamp in the vehicle. The sunshade control instruction can be configured to open or close a sunshade.

In some examples, the vehicle control method includes:

supply power to the adapter via the adapter interface, such that the adapter supplies the power as charging power to the mobile terminal that accesses the cockpit domain controller.

With reference to FIG. 2, a charging management module 221 is configured in the adapter 22, such that power provided by the vehicle can be supplied to the mobile terminal that accesses the cockpit domain controller as charging power. For example, a charging current of 2 A can be supplied to the mobile terminal.

According to the technical solution, the mobile terminal can be connected using the adapter, such that vehicle control can be implemented using the mobile terminal. The mobile terminal can be charged using the adapter, which improves convenience and flexibility.

The examples of the disclosure further provide a vehicle control method. The vehicle control method is performed by an adapter. The adapter is configured with a vehicle interface to connect to an adapter interface. The adapter interface is an adapter interface in a vehicle to which any one of the vehicle control methods according to the foregoing examples is applied, and the adapter is further configured with a terminal interface for being connected to a mobile terminal. As shown in FIG. 3, the vehicle control method includes:

S31, establish a universal serial communication connection between the mobile terminal and the terminal interface of the adapter and between the vehicle interface of the adapter and the adapter interface in response to determining that the mobile terminal accesses a cockpit domain controller of the vehicle using the adapter.

The mobile terminal is connected to the terminal interface of the adapter using the universal serial bus. The vehicle interface of the adapter is connected to the adapter interface using the universal serial bus. That is, the universal serial communication connection is established between the adapter and the cockpit domain controller based on the adapter interface being connected to the vehicle interface, and the universal serial communication connection is established between the adapter and the mobile terminal based on the terminal interface being connected to the mobile terminal.

In an embodiment, the terminal interface may be, for example, any one of a Type-C interface, a Thunderbolt interface, and a Lightning interface. Certainly, the adapter may be configured with a plurality of terminal interfaces, further configured with a plurality of terminal interfaces of the same type, or configured with terminal interfaces of a plurality of types.

With reference to FIG. 2, the adapter 22 includes a vehicle interface 222, a pogo pin connector 223 connected to the vehicle interface 222 using the universal serial bus, a repeater REDRIVER 224 connected to the pogo pin connector 223, and a terminal interface 225 connected to the repeater REDRIVER 224. The adapter interface 21 is connected to a hub 231 in a cockpit domain controller 23 using a universal serial bus S32, receive a vehicle control instruction of a universal serial bus protocol type transmitted by the mobile terminal, where the vehicle control instruction is generated by the mobile terminal in response to a user operation and transmitted to the adapter.

S33, make the cockpit domain controller execute vehicle control corresponding to the vehicle control instruction by forwarding the vehicle control instruction to the cockpit domain controller using a universal serial bus.

The specific embodiment of the example of the disclosure has been described in detail in the vehicle control method on the vehicle side, which is not repeated here.

According to the above solution, a vehicle control function is implemented using the universal serial bus, and communication between the vehicle and the adapter and between the adapter and the mobile terminal is implemented using the universal serial bus, such that the problem of communication between the mobile terminal and the vehicle is solved, the mobile terminal is playable when plugged, usage scenarios in the vehicle are increased, and flexibility of vehicle control is improved. Any adapter interface is connected to the adapter, and then the adapter is connected to the mobile terminal, such that fast iteration of the mobile terminal can be adapted.

In some examples, the vehicle control instruction includes at least one of an air conditioning adjustment instruction, a window control instruction, a seat adjustment instruction, an interior ambient lamp control instruction, and a sunshade control instruction.

In some examples, the vehicle control method includes:

supply power supplied by the cockpit domain controller to the adapter via the adapter interface to the mobile terminal that accesses the cockpit domain controller as charging power.

According to the technical solution, compared with the prior art, a mobile terminal can be charged only at a rear row, the mobile terminal can be charged using the adapter, and vehicle control can be implemented using the adapter, such that the convenience and flexibility of vehicle control are improved.

The examples of the disclosure further provide a vehicle control method. The vehicle control method is performed by a mobile terminal. As shown in FIG. 4, the vehicle control method includes:

S41, establish, in response to determining that the mobile terminal accesses a cockpit domain controller of a vehicle using an adapter, a universal serial communication connection between the mobile terminal and the adapter using a universal serial bus.

The adapter is an adapter in any one of the vehicle control methods according to the foregoing examples. Thus, the communication connection between the adapter and the cockpit domain controller and the communication connection between the mobile terminal and the adapter are separately established using the universal serial bus, and the communication connection between the mobile terminal and the cockpit domain controller is achieved.

In the example of the disclosure, the mobile terminal may be inserted into the terminal interface of the adapter first, and then the vehicle interface of the adapter is inserted into the adapter interface of the vehicle. Alternatively, the vehicle interface of the adapter may be inserted into the adapter interface of the vehicle first, and then the mobile terminal is inserted into the terminal interface of the adapter; the sequence of this does not influence the communication connection between the mobile terminal and the adapter, and each interface may be hot-plugged.

S42, generate a vehicle control instruction of a corresponding universal serial bus protocol type in response to a user operation.

It can be noted that a vehicle control application program may be installed in the mobile terminal, an account may be logged in the vehicle control application program, a control option may be displayed in a user interface of the vehicle control application program, and a corresponding vehicle control instruction of a universal serial bus protocol type may be generated according to an user operation on the control option. For example, a window control option, an air conditioning control option, etc., may be displayed in the user interface of the vehicle control application.

S43, transmit the vehicle control instruction to the adapter using the universal serial bus, such that the adapter forwards the vehicle control instruction to the cockpit domain controller, and the cockpit domain controller executes vehicle control corresponding to the vehicle control instruction.

According to the above solution, a vehicle control function is implemented using the universal serial bus, and communication between the vehicle and the adapter and between the adapter and the mobile terminal is implemented using the universal serial bus, such that the problem of communication between the mobile terminal and the vehicle is solved, the mobile terminal is playable when plugged, usage scenarios in the vehicle are increased, and flexibility of vehicle control is improved. Any adapter interface is connected to the adapter, and then the adapter is connected to the mobile terminal, such that fast iteration of the mobile terminal can be adapted.

In some examples, the vehicle control method includes:
    receive a transmission prohibition instruction transmitted by the cockpit domain controller, where the transmission prohibition instruction is transmitted by the vehicle when it is determined that an adapter interface connected to the mobile terminal is a slave adapter interface; and
    stop a streaming media data transmitting function of the mobile terminal according to the transmission prohibition instruction.

In the example of the disclosure, in response to determining that the transmission prohibition instruction transmitted by the cockpit domain controller is received, the projection operation function on the mobile terminal may be prohibited from being used. For example, the projection operation button displayed on the mobile terminal is hidden, or the projection button gets grayed out. In this way, the projection function of the mobile terminal may be prohibited when the transmission prohibition instruction is received.

In some examples, the vehicle control instruction includes at least one of an air conditioning adjustment instruction, a window control instruction, a seat adjustment instruction, an interior ambient lamp control instruction, and a sunshade control instruction.

Figure 5:
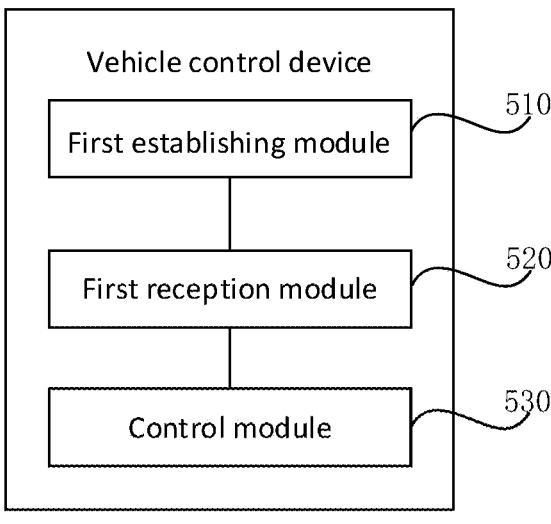
FIG. 5 is a block diagram of a vehicle control device according to an example.

The examples of the disclosure further provide a vehicle control device. The vehicle control device is applied to a vehicle. At least one adapter interface is configured in the vehicle. The adapter interface is connected to a hub in a cockpit domain controller using a universal serial bus. As shown in FIG. 5, the vehicle control device includes:
    a first establishing module 510 configured to establish communication connection between an adapter and the cockpit domain controller via the universal serial bus in response to determining that a mobile terminal accesses the cockpit domain controller using the adapter interface, where universal serial communication connection is established between the mobile terminal and a terminal interface of the adapter and between a vehicle interface of the adapter and the adapter interface;
    a first reception module 520 configured to receive a vehicle control instruction of a universal serial bus protocol type transmitted by the adapter, where the vehicle control instruction is generated by the mobile terminal in response to a user operation and transmitted to the adapter; and
    a control module 530 configured to execute vehicle control corresponding to the vehicle control instruction using the cockpit domain controller.

In some examples, a plurality of adapter interfaces are provided. The vehicle control device includes a fourth establishing module configured to determine a master adapter interface and a slave adapter interface from the plurality of adapter interfaces.

The first reception module 520 is configured to receive streaming media data transmitted by a first target mobile terminal connected to the master adapter interface using the universal serial bus. The first target mobile terminal is connected to the master adapter interface using the adapter. The streaming media data is generated by the first target mobile terminal according to the played audio and video in response to a projection operation.

The control module 530 is configured to perform projection display on a multimedia display screen of the vehicle according to the streaming media data, and transmit, for a second target mobile terminal accessing the cockpit domain controller using the slave adapter interface, a transmission prohibition instruction to the second target mobile terminal using the universal serial bus. The transmission prohibition instruction is configured to prohibit the second target mobile terminal from transmitting the streaming media data to the cockpit domain controller.

In some examples, the fourth establishing module is configured to:
    determine, after the vehicle is started, a corresponding adapter interface first in the communication connection as the master adapter interface, and determine the adapter interfaces other than the master adapter interface as the slave adapter interfaces.

In some examples, the fourth establishing module is configured to:
    display an interface selection option on the multimedia display screen in response to a communication disconnection of a current master adapter interface from a corresponding first target mobile terminal, where the interface selection option is configured to display the adapter interface currently in the communication connection; and
    determine an adapter interface corresponding to a selected interface selection option as the master adapter interface, and determine adapter interfaces other than the master adapter interface as the slave adapter interfaces.

In some examples, the control module 530 is configured to execute, in response to determining that a vehicle control instruction from the first target mobile terminal corresponding to the master adapter interface and a vehicle control instruction from the second target mobile terminal corresponding to the slave adapter interface indicate same vehicle control, vehicle control corresponding to the vehicle control instruction transmitted by the first target mobile terminal using the cockpit domain controller, and invalidate the vehicle control instruction transmitted by the second target mobile terminal.

In some examples, the vehicle control instruction includes at least one of an air conditioning adjustment instruction, a window control instruction, a seat adjustment instruction, an interior ambient lamp control instruction, and a sunshade control instruction.

In some examples, the vehicle control device includes: a power supply module configured to:

supply power to the adapter via the adapter interface, such that the adapter supplies the power as charging power to the mobile terminal that accesses the cockpit domain controller.

Figure 6:
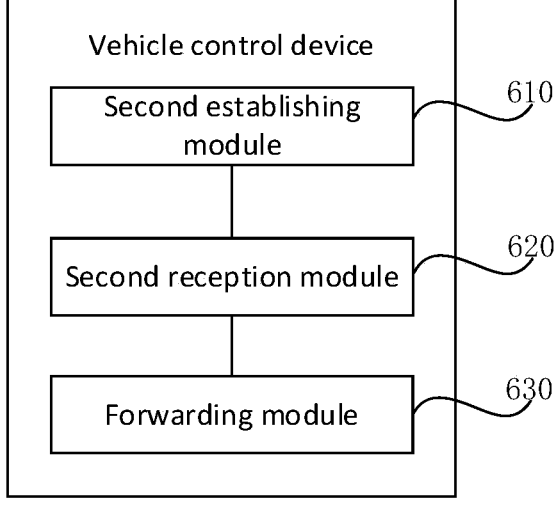
FIG. 6 is a block diagram of another vehicle control device according to an example.

The examples of the disclosure further provide a vehicle control device. The vehicle control device is applied to an adapter. The adapter is configured with a vehicle interface for being connected to an adapter interface. The adapter interface is an adapter interface in a vehicle to which the vehicle control device in the foregoing examples is applied, and the adapter is further configured with a terminal interface for being connected to a mobile terminal. As shown in FIG. 6, the vehicle control device includes:

a second establishing module 610 configured to establish a universal serial communication connection between the mobile terminal and the terminal interface of the adapter and between the vehicle interface of the adapter and the adapter interface in response to determining that the mobile terminal accesses a cockpit domain controller of the vehicle using the adapter;

a second reception module 620 configured to receive a vehicle control instruction of a universal serial bus protocol type transmitted by the mobile terminal, where the vehicle control instruction is generated by the mobile terminal in response to a user operation and transmitted to the adapter; and a forwarding module 630 configured to make the cockpit domain controller execute vehicle control corresponding to the vehicle control instruction by forwarding the vehicle control instruction to the cockpit domain controller using a universal serial bus.

In some examples, the vehicle control instruction includes at least one of an air conditioning adjustment instruction, a window control instruction, a seat adjustment instruction, an interior ambient lamp control instruction, and a sunshade control instruction.

In some examples, the vehicle control device includes: a power supplying module configured to supply power supplied by the cockpit domain controller to the adapter via the adapter interface to the mobile terminal that accesses the cockpit domain controller as charging power.

Figure 7:
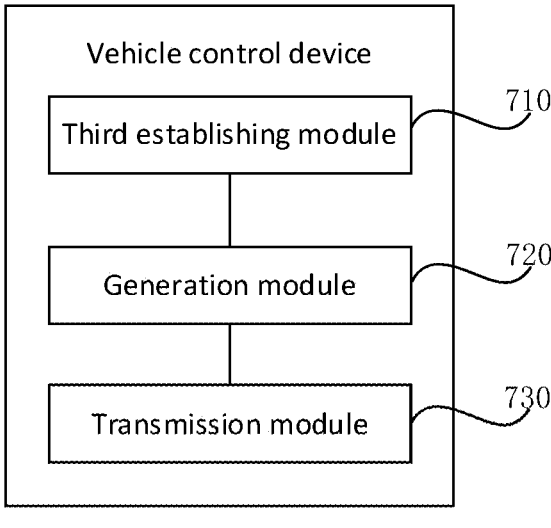
FIG. 7 is a block diagram of yet another vehicle control device according to an example.

The examples of the disclosure further provide a vehicle control device. The vehicle control device is applied to a mobile terminal. As shown in FIG. 7, the vehicle control device includes:

a third establishing module 710 configured to establish, in response to determining that the mobile terminal accesses a cockpit domain controller of a vehicle using an adapter, a universal serial communication connection between the mobile terminal and the adapter using a universal serial bus, where the adapter is the adapter in the vehicle control device according to the fifth aspect;

a generation module 720 configured to generate a vehicle control instruction of a corresponding universal serial bus protocol type in response to a user operation; and a transmission module 730 configured to transmit the vehicle control instruction to the adapter using the universal serial bus, such that the adapter forwards the vehicle control instruction to the cockpit domain controller, and the cockpit domain controller executes vehicle control corresponding to the vehicle control instruction.

In some examples, the vehicle control device includes: a third reception module configured to:

receive a transmission prohibition instruction transmitted by the cockpit domain controller, where the transmission prohibition instruction is transmitted by the vehicle when it is determined that an adapter interface connected to the mobile terminal is a slave adapter interface; and stop a streaming media data transmitting function of the mobile terminal according to the transmission prohibition instruction.

In some examples, the vehicle control instruction includes at least one of an air conditioning adjustment instruction, a window control instruction, a seat adjustment instruction, an interior ambient lamp control instruction, and a sunshade control instruction.

With respect to the vehicle control device in the above examples, particular ways in which the various modules execute operations are described in detail in the examples relating to the method, and will not be described in detail here.

The examples of the disclosure further provide a vehicle, including:

a first processor; and a first memory configured to store an instruction executable by the first processor, where the first processor is configured to execute the executable instruction stored in the first memory, so as to implement any one of the vehicle control methods on a vehicle side according to the foregoing examples.

The examples of the disclosure further provide an adapter, including:

a second processor; and a second memory configured to store an instruction executable by the second processor, where the second processor is configured to execute the executable instruction stored in the second memory, so as to implement any one of the vehicle control methods on an adapter side according to the foregoing examples.

The examples of the disclosure further provide a mobile terminal, including:

a third processor; and a third memory configured to store an instruction executable by the third processor, where the third processor is configured to execute the executable instruction stored in the third memory, so as to implement any one of the vehicle control methods on a mobile terminal side according to the foregoing examples.

The examples of the disclosure further provide a non-transitory computer-readable storage medium. The computer-readable storage medium stores a computer program instruction. The program instruction implements steps of any one of the vehicle control methods on a vehicle side according to the foregoing examples when executed by a fourth processor, implements steps of any one of the vehicle control methods on an adapter side according to the foregoing examples when executed by a fifth processor, or implements steps of any one of the vehicle control methods on a mobile terminal side according to foregoing examples when executed by a sixth processor.

Figure 8:
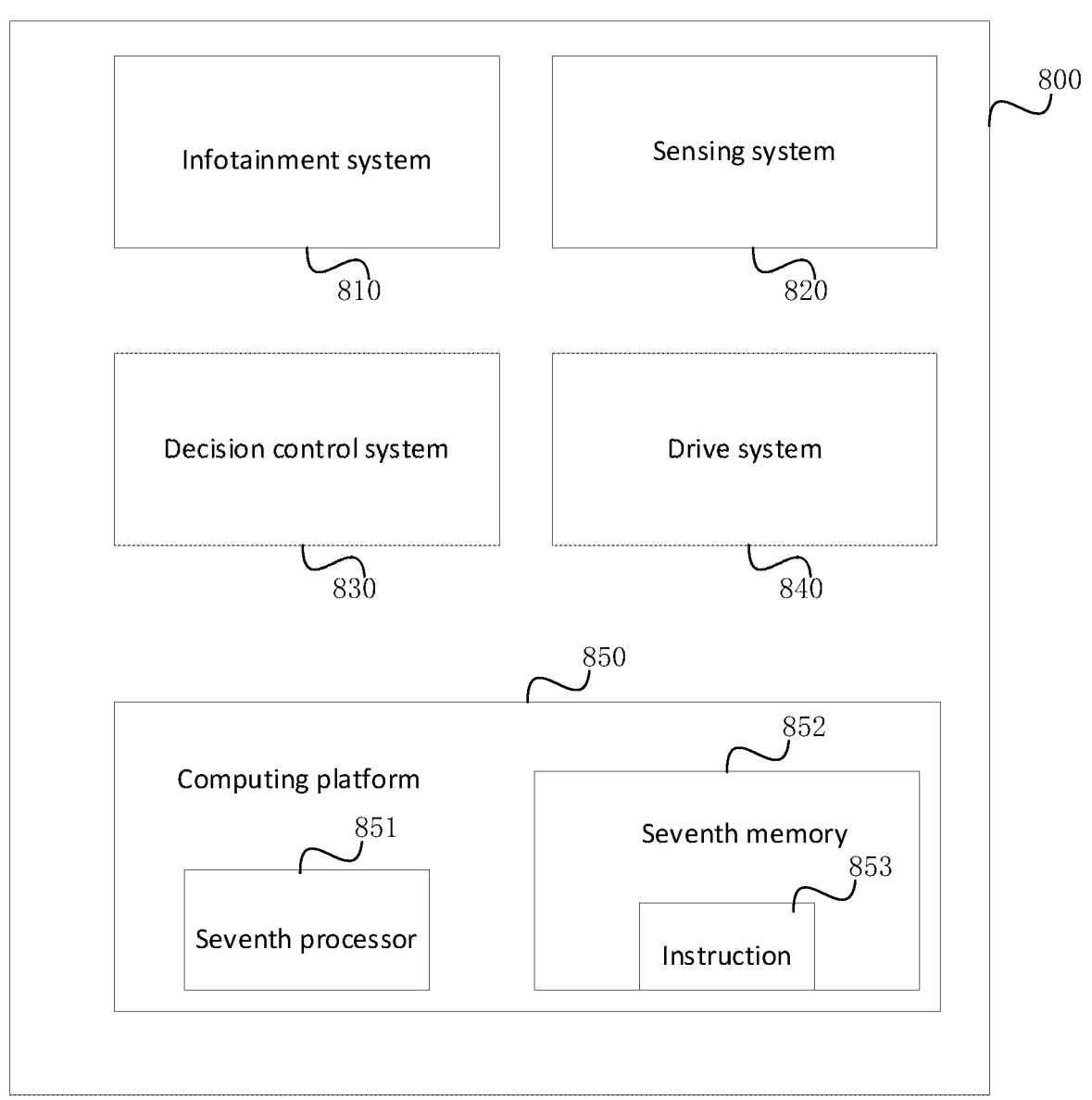
FIG. 8 is a schematic functional block diagram of a vehicle according to an example.

FIG. 8 is a block diagram of a vehicle 800 according to an example. For example, the vehicle 800 may be a hybrid vehicle, and may also be a non-hybrid vehicle, an electric vehicle, a fuel cell vehicle, or other type of vehicles. The vehicle 800 may be an autonomous vehicle, a semi-autonomous vehicle, or a non-autonomous vehicle.

With reference to FIG. 8, the vehicle 800 may include various subsystems, such as an infotainment system 810, a sensing system 820, a decision control system 830, a drive system 840, and a computing platform 850. The vehicle 800 may further include more or fewer subsystems, and each subsystem may include a plurality of components. Moreover, subsystems and components of the vehicle 800 may be interconnected by wire or wireless.

In some examples, the infotainment system 810 may include a communication system, an entertainment system, a navigation system, etc.

The sensing system 820 may include several sensors for sensing information about the environment surrounding the vehicle 800. For example, the sensing system 820 may include a global positioning system (GPS system, Beidou system, or other positioning systems), an inertial measurement unit (IMU), a laser radar, a millimeter wave radar, an ultrasonic radar, and a camera.

The decision control system 830 may include a computing system, a vehicle controller, a steering system, a throttle, and a braking system.

The drive system 840 may include components that supply power to the vehicle 800 for motion. In an example, the drive system 840 may include an engine, an energy source, a drivetrain, and wheels. The engine may be one or a combination of an internal combustion engine, an electric motor, and an air compression engine. The engine can convert energy supplied by an energy source into mechanical energy.

Some or all of the functions of the vehicle 800 are controlled by the computing platform 850. The computing platform 850 may include at least one seventh processor 851 and a seventh memory 852. The seventh processor 851 may execute an instruction 853 stored in the seventh memory 852.

The seventh processor 851 may be any conventional processor, such as a commercially available central processing unit (CPU). The processor may further include, for example, a graphics process unit (GPU), a field-programmable gate array (FPGA), a system on chip (SOC), an application-specific integrated circuit (ASIC), or a combination of them.

The seventh memory 852 may be implemented by any types of volatile or non-volatile memory devices or their combinations, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

Besides the instruction 853, the seventh memory 852 may store data such as road maps, route information, a location, a direction, a speed, etc., of the vehicle. The seventh memory 852 stores data that may be used by the computing platform 850.

In the example of the disclosure, the seventh processor 851 may execute the instruction 853 to complete all or some of the steps of the vehicle control method described above on the vehicle side.

Figure 9:
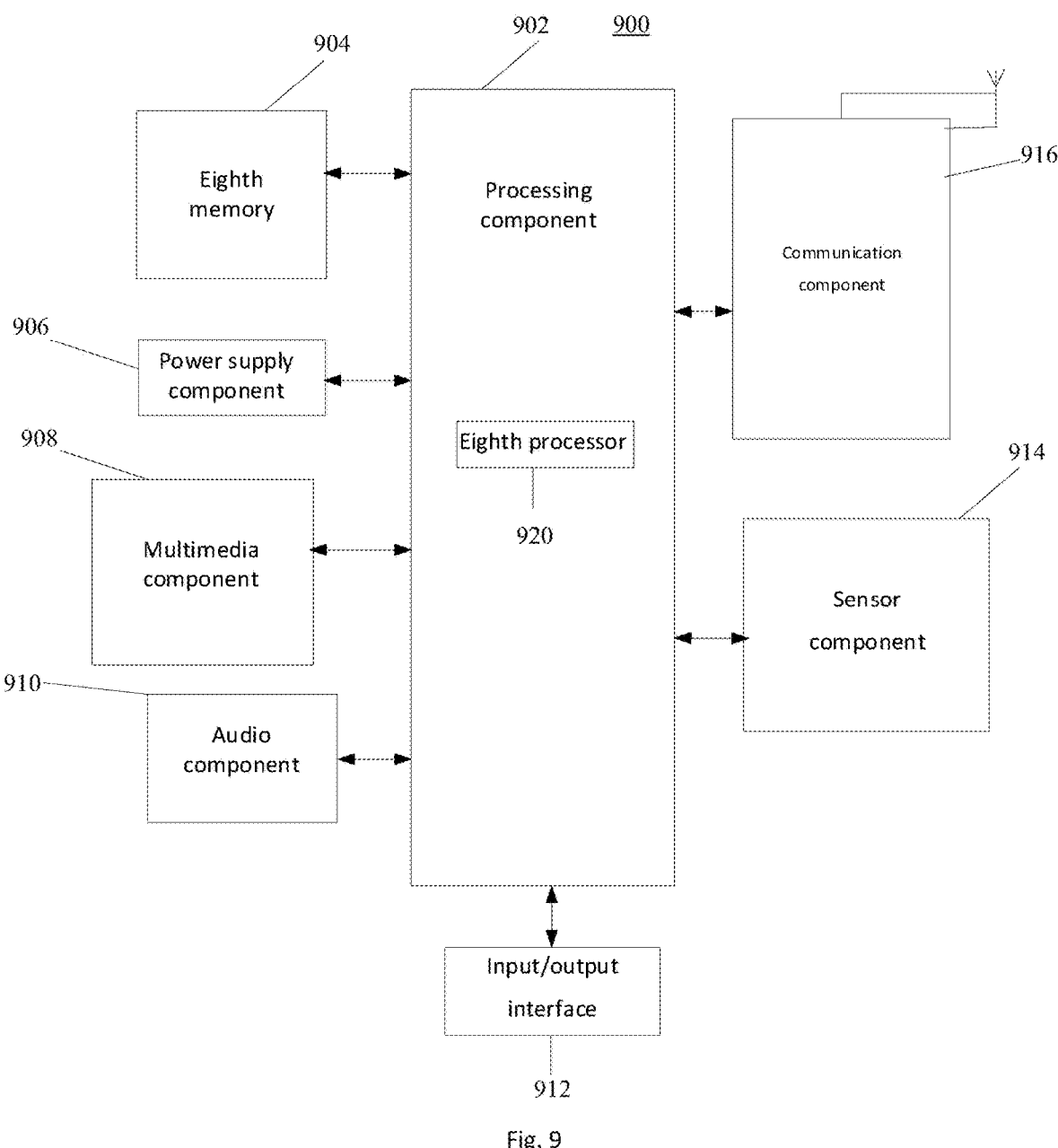
FIG. 9 is a block diagram of a mobile terminal for vehicle control according to an example.

FIG. 9 is a block diagram of a mobile terminal 900 for vehicle control according to an example. For example, the mobile terminal 900 may be a mobile phone, a computer, a digital broadcast terminal, a messaging apparatus, a gaming console, a tablet apparatus, a medical apparatus, a fitness apparatus, or a personal digital assistant, etc.

With reference to FIG. 9, the mobile terminal 900 may include one or more of a processing component 902, an eighth memory 904, a power supply component 906, a multimedia component 908, an audio component 910, an input/output interface 912, a sensor component 914, and a communication component 916.

The processing component 902 generally controls the overall operation of the mobile terminal 900, for example, operations associated with display, phone calls, data communications, camera operations, and recording operations. The processing component 902 may include one or more eighth processors 920 to execute an instruction to complete all or some of the steps of the method above. Moreover, the processing component 902 may include one or more modules to facilitate interaction between the processing component 902 and other components. For example, the processing component 902 may include the multimedia module to facilitate interaction between the multimedia component 908 and the processing component 902.

The eighth memory 904 is configured to store various types of data to support an operation on the mobile terminal 900. Instances of such data include an instruction, operated on the mobile terminal 900, for any application or method, contact data, phonebook data, messages, pictures, video, etc. The eighth memory 904 may be implemented by any types of volatile or non-volatile memory devices or their combinations, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 906 supplies power to the various assemblies of the mobile terminal 900. The power supply component 906 may include a power management system, one or more power supplies, and other assemblies associated with power generation, management, and distribution for the mobile terminal 900.

The multimedia component 908 includes a screen that provides an output interface between the mobile terminal 900 and the user. In some examples, the screen may include a liquid crystal display (LCD) and a touch panel (TP). If the screen includes a touch panel, the screen may be implemented as a touch screen, so as to receive an input signal from a user. The touch panel includes one or more touch sensors to sense touches, slides, and gestures on the touch panel. The touch sensor may not only sense a boundary of a touch or slide action, but also detect duration and pressure related to the touch or slide operation. In some examples, the multimedia component 908 includes a front-facing camera and/or a rear-facing camera. When the mobile terminal 900 is in an operational mode, for example, a photographing mode or a video mode, the front-facing camera and/or the rear-facing camera may receive external multimedia data. Each of the front-facing camera and the rear-facing camera may be a fixed optical lens system or have a focal length and optical zoom capability.

The audio component 910 is configured to output and/or input audio signals. For example, the audio component 910 includes a microphone (MIC) configured to receive an external audio signal when the mobile terminal 900 is in the operational mode, such as a call mode, a recording mode, and a speech recognition mode. The received audio signal may be further stored in the eighth memory 904 or transmitted via the communication component 916. In some examples, the audio component 910 further includes a speaker for outputting an audio signal.

The input/output interface 912 provides an interface between the processing component 902 and a peripheral interface module. The peripheral interface module may be a keyboard, a click wheel, a button, etc. These buttons may include, but are not limited to, a home button, a volume button, a start button, and a lock button.

The sensor component 914 includes one or more sensors for providing state assessments of various aspects of the mobile terminal 900. For example, the sensor component 914 may detect an on/off state of the mobile terminal 900 and the relative positioning of the components. For example, the components are a display and a keypad of the mobile terminal 900. The sensor component 914 may also detect a change in position of the mobile terminal 900 or a component of the mobile terminal 900, the presence or absence of contact between the user and the mobile terminal 900, orientation or acceleration/deceleration of the mobile terminal 900, and temperature variation of the mobile terminal 900. The sensor component 914 may include a proximity sensor configured to detect the presence of a nearby object in the absence of any physical contact. The sensor component 914 may also include a light sensor, for example, a complementary metal-oxide-semiconductor (CMOS) or charge-coupled device (CCD) image sensor, for imaging applications. In some examples, the sensor component 914 may further include an acceleration sensor, a gyroscope sensor, a magnetic sensor, a pressure sensor or a temperature sensor.

The communication component 916 is configured to facilitate communication between the mobile terminal 900 and other devices in a wired or radio mode. The mobile terminal 900 may access a wireless network based on a communication standard, for example, WiFi, 2G, or 3G, or their combinations. In an example, the communication component 916 receives a broadcast signal or broadcast-related information from an external broadcast management system via a broadcast channel. In an example, the communication component 916 also includes a near-field communication (NFC) module to facilitate short-range communication. For example, the NFC module may be implemented based on a radio frequency identification (RFID) technology, an infrared data association (IrDA) technology, an ultra wide band (UWB) technology, a Bluetooth (BT) technology, or other technologies.

In an example, the mobile terminal 900 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for executing the vehicle control method on a mobile terminal side.

In an example, a non-transitory computer-readable storage medium is further provided and includes instructions, for example, an eighth memory 904 including instructions which are executable by an eighth processor 920 of a mobile terminal 900, to complete the methods above. For example, the non-transitory computer-readable storage medium may be a read-only memory (ROM), a random access memory (RAM), a compact disc read-only memory (CD-ROM), a magnetic tape, a floppy disk, an optical data storage apparatus, etc.

Other examples of the disclosure will readily occur to those skilled in the art upon consideration of the specification and practical disclosure. The present application is intended to cover any variations, uses, or adaptations of the disclosure, and these variations, uses, or adaptations follow general principles of the disclosure and include common general knowledge or customary technical means in the technical field not disclosed in the disclosure. The description and examples are considered as illustrative only, and the true scope and spirit of the disclosure are indicated by the following claims.

It should be understood that the disclosure is not limited to the precise structure that has been described above and shown in the accompanying drawings, and that various modifications and changes may be made without departing from its scope. The scope of the disclosure is limited only by the appended claims.

What is claimed is:

1. A vehicle control method, performed by a vehicle, comprising:

establishing a communication connection between an adapter and a cockpit domain controller via a universal serial bus in response to determining that a mobile terminal accesses the cockpit domain controller using an adapter interface, wherein a universal serial communication connection is established between the mobile terminal and a terminal interface of the adapter and between a vehicle interface of the adapter and the adapter interface;

receiving a vehicle control instruction of a universal serial bus protocol type transmitted by the adapter, wherein the vehicle control instruction is generated by the mobile terminal in response to a user operation and transmitted to the adapter; and executing vehicle control corresponding to the vehicle control instruction using the cockpit domain controller;

wherein a plurality of adapter interfaces are provided, and the vehicle control method further comprises:

determining a master adapter interface and a slave adapter interface from the plurality of adapter interfaces;

wherein determining the master adapter interface and the slave adapter interface from the plurality of adapter interfaces comprises:

determining, after the vehicle is started, a corresponding adapter interface first in the communication connection as the master adapter interface, and determining adapter interfaces other than the master adapter interface as the slave adapter interface.

2. The vehicle control method according to claim 1, further comprising:

receiving streaming media data that is transmitted by a first target mobile terminal connected to the master adapter interface using the universal serial bus, wherein the first target mobile terminal is connected to the master adapter interface using the adapter, and the streaming media data is generated by the first target mobile terminal according to played audio and video in response to a projection operation;

performing projection display on a multimedia display screen of the vehicle according to the streaming media data; and transmitting, for a second target mobile terminal accessing the cockpit domain controller using the slave adapter interface, a transmission prohibition instruction to the second target mobile terminal using the universal serial bus, wherein the transmission prohibition instruction is configured to prohibit the second target mobile terminal from transmitting the streaming media data to the cockpit domain controller.

3. The vehicle control method according to claim 2, wherein determining the master adapter interface and the slave adapter interface from the plurality of adapter interfaces comprises:

displaying an interface selection option on the multimedia display screen in response to a communication disconnection of a current master adapter interface from a corresponding first target mobile terminal, wherein the interface selection option is configured to display a respective adapter interface currently in the communication connection; and determining a selected interface corresponding to a selected interface selection option as the master adapter interface, and determining the adapter interfaces other than the master adapter interface as the slave adapter interface.

4. The vehicle control method according to claim 2, wherein executing the vehicle control corresponding to the vehicle control instruction using the cockpit domain controller comprises:

executing, in response to determining that the vehicle control instruction from the first target mobile terminal corresponding to the master adapter interface and the vehicle control instruction from the second target mobile terminal corresponding to the slave adapter interface indicate same vehicle control, vehicle control corresponding to the vehicle control instruction transmitted by the first target mobile terminal using the cockpit domain controller, and invalidating the vehicle control instruction transmitted by the second target mobile terminal.

5. The vehicle control method according to claim 1, wherein the vehicle control instruction comprises at least one of:

an air conditioning adjustment instruction;
a window control instruction;
a seat adjustment instruction;
an interior ambient lamp control instruction; or
a sunshade control instruction.

6. The vehicle control method according to claim 1, further comprising:

supplying power to the adapter via the adapter interface, wherein the adapter supplies the power as charging power to the mobile terminal that accesses the cockpit domain controller.

7. A vehicle, comprising:
one or more first processors; and
a first memory configured to store instructions;
wherein
the instructions, when collectively executed by the one or more first processors, cause the vehicle to perform the vehicle control method according to claim 1.

8. A non-transitory computer-readable storage medium storing computer program instructions, wherein the computer program instructions, when executed by one or more processors, cause the one or more processors to collectively perform the vehicle control method according to claim 1.

9. The vehicle control method according to claim 1, wherein a plurality of adapter interfaces are provided; different adapter interfaces are provided in different control areas of the vehicle; and the different control areas are divided according to seat distribution in the vehicle.

10. A vehicle control method, performed by an adapter, comprising:

establishing a universal serial communication connection between a mobile terminal and a terminal interface of the adapter and between a vehicle interface of the adapter and an adapter interface in response to determining that the mobile terminal accesses a cockpit domain controller of a vehicle using the adapter connected to a universal serial bus;

receiving a vehicle control instruction of a universal serial bus protocol type transmitted by the mobile terminal, wherein the vehicle control instruction is generated by the mobile terminal in response to a user operation and transmitted to the adapter; and forwarding the vehicle control instruction to the cockpit domain controller using the universal serial bus to enable the cockpit domain controller to execute vehicle control corresponding to the vehicle control instruction;

wherein a plurality of adapter interfaces are provided, and the plurality of adapter interfaces comprise a master adapter interface and a slave adapter interface; and wherein a corresponding adapter interface first in the communication connection after the vehicle is started is determined as the master adapter interface, and adapter interfaces other than the master adapter interface are determined as the slave adapter interface.

11. The vehicle control method according to claim 10, wherein the vehicle control instruction comprises at least one of:

an air conditioning adjustment instruction;
a window control instruction;
a seat adjustment instruction;
an interior ambient lamp control instruction; or
a sunshade control instruction.

12. The vehicle control method according to claim 10, further comprising:

supplying power supplied by the cockpit domain controller to the adapter through via the adapter interface to the mobile terminal that accesses the cockpit domain controller as charging power.

13. The adapter, comprising:
one or more second processors; and
a second memory configured to store instructions;
wherein the instructions, when collectively executed by the one or more second processors, cause the adapter to perform the vehicle control method according to claim 10.

14. A non-transitory computer-readable storage medium storing computer program instructions, wherein the computer program instructions, when executed by one or more processors, cause the one or more processors to collectively perform the vehicle control method according to claim 10.

15. A vehicle control method, performed by a mobile terminal, comprising:

establishing, in response to determining that the mobile terminal accesses a cockpit domain controller of a vehicle using an adapter, a universal serial communication connection between the mobile terminal and the adapter using a universal serial bus;

generating a vehicle control instruction of universal serial bus protocol type in response to a user operation; and transmitting the vehicle control instruction to the adapter using the universal serial bus, wherein the adapter forwards the vehicle control instruction to the cockpit domain controller, and the cockpit domain controller executes vehicle control corresponding to the vehicle control instruction;

wherein a plurality of adapter interfaces are provided, and the plurality of adapter interfaces comprise a master adapter interface and a slave adapter interface; and wherein a corresponding adapter interface first in the communication connection after the vehicle is started is determined as the master adapter interface, and adapter interfaces other than the master adapter interface are determined as the slave adapter interface.

16. The vehicle control method according to claim 15, further comprising:

receiving a transmission prohibition instruction transmitted by the cockpit domain controller, wherein the transmission prohibition instruction is transmitted by the vehicle when it is determined that the adapter interface connected to the mobile terminal is a slave adapter interface; and stopping a streaming media data transmitting function of the mobile terminal according to the transmission prohibition instruction.

17. The vehicle control method according to claim 15, wherein the vehicle control instruction comprises at least one of:

an air conditioning adjustment instruction;

a window control instruction;

a seat adjustment instruction;

an interior ambient lamp control instruction; or a sunshade control instruction.

18. The mobile terminal, comprising:

one or more third processors; and a third memory configured to store instructions;

wherein the instructions, when collectively executed by the one or more third processors, cause the mobile terminal to perform the vehicle control method according to claim 15.

19. A non-transitory computer-readable storage medium storing computer program instructions, wherein the computer program instructions, when executed by one or more processors, cause the one or more processors to collectively perform the vehicle control method according to claim 15.

* * * * *